United States Patent Office 3,525,871
Patented Aug. 25, 1970

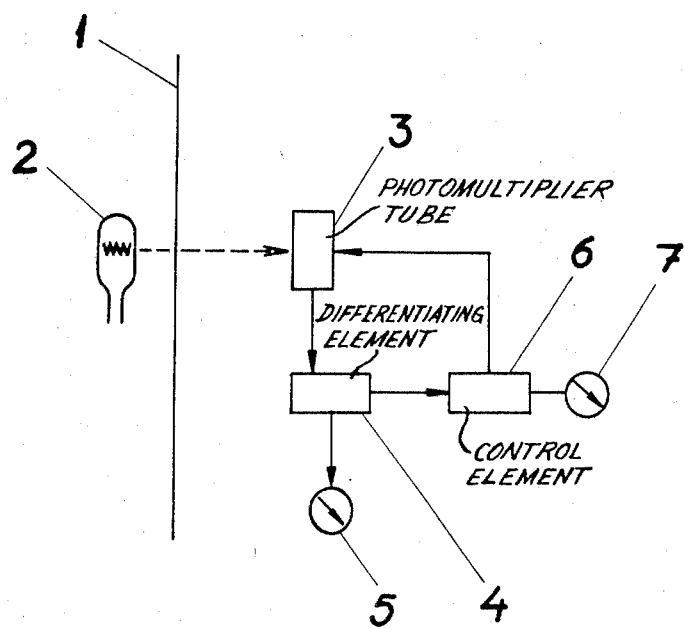

3,525,871
METHOD AND DEVICE FOR DETERMINING
NON-UNIFORM PAPER FORMATION
Antti Lehtinen, Jyvaskyla, Finland, assignor to Valmet
Oy, Helsinki, Finland, a corporation of Finland
Filed Feb. 15, 1968, Ser. No. 705,683
Claims priority, application Finland, Oct. 31, 1967,
2,932/67
Int. Cl. G01n 21/30; H01j 39/12
U.S. Cl. 250—219
3 Claims

ABSTRACT OF THE DISCLOSURE

A method and a device used for measuring non-uniformity of paper formation are independent of the opacity of the paper. The measurements are carried out by passing a light beam through a moving paper web and causing the beam to strike a photomultiplier tube connected with a differentiating element dividing the anode voltage produced in the photomultiplier tube into a D.C. component and an A.C. component. The D.C. component is transmitted to a control element which so regulates by feedback the anode voltage of the multiplier tube that the D.C. component remains constant. Then, an instrument measuring the A.C. component will measure directly the paper formation.

---

The present invention concerns measurement of paper formation, independent of opacity. More particularly, it refers to a method for measuring paper formation in which the variations in the paper's light transmittance are utilized in that a light beam is passed through the moving paper web and after passing through the paper this beam is allowed to act on a light-sensitive element and as a measure for the non-uniformity in the formation of the paper the ratio of the A.C. component and D.C. component or some comparable quantity is used.

In a method for measuring the formation (or cloudiness) of paper the procedure is used wherein a light beam moving relatively to the paper is passed through the paper. The transmitted light is arranged to act on a light-sensitive element (hereinafter called the cell) on the other side of the paper. In this cell a voltage proportional to the intensity of the incident light is produced. The voltage, or the current produced by it, when considered as a function of time or of the traversed distance, is composed of a D.C. component, which is the same as the average value $\overline{U}$, and an A.C. component. The D.C. component will conform to the average transparency of the paper, while the A.C. component represents the non-uniformity in paper formation. This A.C. component is usually measured in terms of its R.M.S. value $U_m$, which can be defined by the formula $$U_m = \sqrt{(U-\overline{U})^2}$$

However, the quantity $U_m$ does not alone reflect the uniformity of the paper, and this is only done by the ratio $U_m/\overline{U}$, which is no longer dependent on the intensity of the light source and other secondary factors. Moreover, this quantity does not depend on the opacity of the paper so that the cloudiness of paper can be measured independent of opacity. This ratio is a characteristic value for each particular kind of paper because $U_m$ and $\overline{U}$ for a given paper are directly proportional at least in a certain range. It was found from investigations performed that $U_m/\overline{U}$ is more reliable than any other common indicators of paper formation, particularly when the output of a given paper machine is examined. A continuously operating ("on-machine") instrument measuring this quantity would be ad esirable addition to the instrumentation of paper machines.

If the D.C. component is artificially maintained constant, that is if the sensitivity of the measuring instrument is varied in conformity to the opacity of the paper which is being produced, the same result is obtained by mere measurement of the A.C. component as when the quantity $U_m/\overline{U}$ is measured. The measuring equipment has the highest possible degree of simplicity, since $U_m$ may be measured with a common A.C. measuring instrument. The result of measurement thus obtained is not influenced by the speed of the paper machine either, and the resulting value, which corresponds to the $U_m/\overline{U}$ value, would be a desirable addition to the instrumentation of the true paper formation, i.e., of the impression gained by the average human eye on viewing a paper sample against a light source.

Previously, in another patent application by the same applicant a paper formation measuring method has been described in which as a measure for the non-uniformity of the paper the ratio of the A.C. and D.C. components obtained from the lightsensitive unit is employed, and in one of the embodiments of said application it is suggested that the measurement be performed by artificially maintaining the D.C. component at constant magnitude. On the basis of what was disclosed in said previous application, the D.C. component may be maintained constant in its magnitude by interposing in the path of the light beam passing through the paper an iris stop, the aperture of which is automatically so adjusted that said condition is satisfied.

The present invention pertains to a device wherein, with a photomultiplier tube for light-sensitive element, the automatic adjustment employed is the control of the output sensitivity accomplished by changing the plate voltage of the tube. In such a procedure the D.C. component of the plate current from the tube is arranged to control the plate voltage of the tube, which thus changes when the average light transmittance of the paper changes.

The following advantages are then gained, compared to the above described embodiment of the above-mentioned previous patent application.

(1) It is easier to protect the photomultiplier tube against current overload;

(2) When the plate voltage is adjusted, no changes of the intensity of the light source are necessary. This results in the advantage that the ratio of the desired signal power and noise power will be more favourable. The signal power is that which is the object of measurement and which is perturbed by the noise power. The signal/noise power ratio improves on transition from thicker to thinner paper. If the lamp voltage is adjusted, the signal/noise power ratio would remain unchanged, and it would be determined as for the thicker paper.

(3) The adjustable stop being a mechanical device, its operation is impeded by dust, and it is to be noted that dusty conditions often prevail at the site of measurement. In a method according to the present invention there are no detrimental effects from dust.

(4) Progressive enlarging of the stop aperture causes progressive impairment in the sharpness of the image. This drawback does not occur in a method according to the present invention.

In addition to the above-mentioned advantages, the present method provides the new, unexpected advantage that in connection with said adjustment or control, measurement of the base weight of the paper becomes possible.

In the manufacturing of paper a very essential characteristic feature specifying the quality of the finished product is its weight per m.$^2$, or its so-called base weight, which is required to be within given tolerance limits for each given type of paper. The base weight may be supervised e.g. by taking from the finished paper rolls samples of a given size and weighing them, in connection of which the moisture content of the samples has to be considered. Since no means exist for changing the base weight of finished paper, it would be desirable to be able to measure this characteristic already in the course of production by means of a continuously operating on-line instrument. In that case it would be possible immediately undertake requisite corrective adjustments if the instrument should indicate deviation of the base weight from its tolerance range. For that purpose the so-called beta instrument has been produced, which operates on the principle that the amount of beta radiation passing through the paper from the source of radiation to the detector is measured. This base weight measuring instrument operating on the principle of beta radiation intensity measurement has a notable shortcoming, which is due to the fact that the fibres in the paper, and water, both absorb beta radiation about equally. As a consequence it cannot be stated with any certainty whether a change in base weight indicated by the beta measuring instrument is due to change of the fibre quantity in the paper or to change of its moisture content. However, the primary object in measuring the base weight of paper is to follow the changes in fibre content; it would therefore be desirable that the base weight measurement could be carried out independent of changes in moisture content.

A method according to the present invention enables the variations of base weight to be continuously followed on the paper machine and those adjustments of the machine to be found which produce the desired base weight of the paper, without any detrimental influence of changes in moisture content on ths base weight measurement.

An advantage of a base weight measuring instrument according to the invention, compared to the beta instrument, is that the effect of changes in moisture content of the paper on the base weight reading is minimal, because with a given type of paper the changes in average light transmittance are mainly due to changes in the fibre quantity.

In the following, the invention is described, as exemplified by one of its embodiments, and with reference to the attached drawing.

In the drawing, the lamp 2 emits through the moving paper web 1 a light beam, which strikes the photomultiplier tube 3. The plate current produced in the multiplier tube is directed to enter a differentiating element 4, which divides it into a D.C. component and an A.C. component. The D.C. component is passed to a control element 6, which regulates by means of feedback the plate voltage of the multiplier tube 3 in that the D.C. component of the multiplier tube remains constant independently of the average light transmittance of the paper. To the control element 6 a multiplier tube plate voltage meter 7 has been connected, which at the same time indicates for a given type of paper the changes of base weight occurring in it. The A.C. component is passed from the differentiating element 4 to an A.C. measuring instrument 5, which in its turn directly measures the paper formation, because the D.C. component is automatically maintained constant.

When connected as described above, the paper formation measuring instrument simultaneously measures both the non-uniformity in paper formation and the base weight of the paper in a continuous on-line measuring process.

The invention is not restricted to the embodiment described in the foregoing, and it may be varied in numerous ways without leaving the coverage of the invention.

I claim:

1. The method of measuring non-uniformity of paper formation independently of the opacity of the paper, which comprises passing a light beam through a traveling paper web, then causing it to strike a light-sensitive element to produce an anode current, separating the A.C. and D.C. components of the anode current, causing the D.C. component to produce a feedback and adjusting with said feedback the anode voltage of said element so that the D.C. component will always have a predetermined specific value, and measuring the magnitude of the A.C. component to indicate the extend of non-uniformity of paper formation.

2. A device for measuring non-uniformity of a moving paper web independently of the opacity of the paper, said device comprising a source transmitting a light beam through the paper web, a photomultiplier tube receiving said light beam and producing an anode current, a differentiating element connected with said tube for dividing said anode current into a D.C. component and an A.C. component, a control element connected with said differentiating element and said tube for regulating by feedback the anode voltage of said photomultiplier tube to maintain constant said D.C. component, an A.C. measuring instrument connected with said differentiating element and a D.C. measuring voltmeter connected with said control element.

3. Method according to claim 1, characterized in that the value of the controlled anode voltage is used for an indicator of the paper's base weight.

References Cited

UNITED STATES PATENTS

| 2,290,775 | 7/1942 | Snyder | 250—214 X |
|---|---|---|---|
| 3,026,415 | 3/1962 | Lake et al. | |
| 3,073,153 | 1/1963 | Petitjean | 162—263 X |
| 3,340,400 | 9/1967 | Quittner. | |
| 3,400,270 | 9/1968 | Durig | 250—214 X |
| 3,437,823 | 4/1969 | Joyce | 250—214 X |

ARCHIE BORCHELT, Primary Examiner

C. M. LEEDOM, Assistant Examiner

U.S. Cl. X.R.

162—236; 235—196; 250—210, 214; 324—140; 356—200